US008268254B2

(12) United States Patent
Van Bonn et al.

(10) Patent No.: US 8,268,254 B2
(45) Date of Patent: Sep. 18, 2012

(54) METHOD AND APPARATUS FOR THE FLUORINATION OF PLASTICS

(75) Inventors: Rolf Van Bonn, Duisburg (DE); Joachim Barbe, Tönisvorst (DE)

(73) Assignee: L'Air Liquide Societe Anonyme pour L'Etude Et L'Exploitation des Procedes Georges Claude, Paris (FR)

( * ) Notice: Subject to any disclaimer, the term of this patent is extended or adjusted under 35 U.S.C. 154(b) by 285 days.

(21) Appl. No.: 12/282,290

(22) PCT Filed: Mar. 13, 2007

(86) PCT No.: PCT/EP2007/002181
§ 371 (c)(1),
(2), (4) Date: Jan. 14, 2009

(87) PCT Pub. No.: WO2007/107261
PCT Pub. Date: Sep. 27, 2007

(65) Prior Publication Data
US 2010/0063206 A1 Mar. 11, 2010

(30) Foreign Application Priority Data

Mar. 17, 2006 (DE) .......................... 10 2006 012 366
Mar. 17, 2006 (DE) .......................... 10 2006 012 367
Mar. 17, 2006 (DE) .......................... 10 2006 012 368
Mar. 24, 2006 (DE) .......................... 10 2006 013 681

(51) Int. Cl.
*B01J 10/00* (2006.01)
*B01J 19/00* (2006.01)
*F27B 15/18* (2006.01)
(52) U.S. Cl. ......... 422/129; 422/145; 422/198; 422/224
(58) Field of Classification Search .................. 525/50, 525/326.1, 326.4; 422/129, 198, 224, 145
See application file for complete search history.

(56) References Cited

U.S. PATENT DOCUMENTS

| 4,142,032 | A | * | 2/1979 | D'Angelo | .................. | 525/356 |
| 4,994,308 | A | | 2/1991 | Tarancon | | |
| 5,242,661 | A | | 9/1993 | Tarancon | | |
| 5,292,466 | A | | 3/1994 | Van Bonn | | |
| 5,882,728 | A | * | 3/1999 | Buschges et al. | ............. | 427/237 |

FOREIGN PATENT DOCUMENTS

| DE | 19832559 | 3/2000 |
| EP | 0566883 | 3/1993 |
| EP | 0809670 | 12/1997 |
| EP | 1234849 | 8/2002 |
| EP | 1488851 | 12/2004 |
| JP | 59218830 | 12/1984 |
| WO | WO 83/03419 | 10/1983 |

OTHER PUBLICATIONS

PCT Search Report for PCT/EP2007/002181, Jul. 2007.
Du Toit F.J., Sanderson R.D.: "Surface Fluorination of Polypropylene 1. Characterisation of Surface Properties" Journal of Fluorine Chemistry, vol. 09, 1999, pp. 017-114.
Krueger G.: "Vorbehandlung Von Kunststoffen Fuer Klebverbindungen" Jun. 1, 1993, Gummi, Fasern, Kunststoffe. Internationale Fachzeitschrift Fur Die Polymer-Verarbeitung, Gentner Verlag; pp. 292, 294-295.

* cited by examiner

*Primary Examiner* — Ling Choi
*Assistant Examiner* — Monique Peets
(74) *Attorney, Agent, or Firm* — Allen E. White

(57) ABSTRACT

The gas-phase fluorination of plastic articles is effected in a reaction chamber 1 into which the plastic articles to be fluorinated are introduced. The gas-phase fluorination is effected at normal or atmospheric ambient pressure of about 1 kPa in the reaction chamber. The gas-phase fluorination can be carried out statically or dynamically. The flushing carried out before the gas-phase fluorination for complete or partial removal of atmospheric oxygen from the reaction chamber 1 can also be effected at atmospheric pressure in the reaction chamber. The reaction chamber 1 is equipped with a cover 2 and metering valves V0, V1, V2 for air, inert gas and gas mixture comprising fluorine and one or more inert gases are present on the entrance side of the reaction chamber, which is not vacuum-tight and hence also cannot be evacuated. The metering valves are connected to the reaction chamber 1 via a flow meter 4. A release valve V3 and a flow-through/shut-off valve V4 are arranged in an exhaust gas line 8 of the reaction chamber 1.

23 Claims, 2 Drawing Sheets

METHOD AND APPARATUS FOR THE FLUORINATION OF PLASTICS

This application is a §371 of International PCT Application PCT/EP2007/002181, filed Mar. 13, 2007.

FIELD OF THE INVENTION

The invention relates to a method for the fluorination of plastics, in which the plastic articles to be fluorinated are introduced into a reaction chamber and subjected to a gas-phase fluorination, and an apparatus for the fluorination of plastics. The method and the apparatus are also suitable for the fluorination of rubber.

BACKGROUND

By fluorination, it is possible to establish a very wide range of surface properties:
- improvement of the barrier effect, build-up of permeation barrier layer/odour barrier;
- improvement of the chemical resistance and the thermal stability;
- activation for adhesion promotion for coating materials (paints, finishes, adhesives, etc.);
- chemical roughening of the surfaces, microstructuring;
- chemical smoothing of the surfaces, minimization of interfacial interactions;
- reduction of the coefficients of friction, for example improvement of the mounting of seals;
- permanent hydrophilic treatment of plastic surfaces, optimization of the wettability;
- permanent hydrophobic treatment of plastic surfaces, reduction of water absorption.

The treatment of non-polar polymer materials with fluorine results in a polar surface owing to partial substitution of the CH bonds by CF groups. The interactions of the surface thus produced with non-polar liquids are substantially reduced with regard to wettability and swellability. Finally, the chemical composition of the surface results in a reduction of permeation.

Exchanging hydrogen atoms for fluorine atoms results in dipoles in the polymer. As a result, the basic precondition for chemical bonding is created. In addition, the incorporation of fluorine atoms into the polymer building blocks produces chemical roughening of the surface, with the result that mechanical anchoring of the coating material is achieved. The combination of chemical bonding and mechanical anchoring permits a strong adhesive bond that is stable in the long term.

By incorporating fluorine atoms into the polymer, a "Teflon-analogous" surface structure is formed. A property jump associated therewith results in an improvement in the thermal stability and the chemical resistance of the plastic, for example to acids and alkalis.

Two different methods are used for carrying out the fluorination.

The in-line method can be applied only to hollow bodies. In this method, the fluorination—of only the inner surface of the hollow body—takes place during manufacture in the blow extrusion method. In contrast to the off-line method, an additional treatment effort is dispensed with thereby.

The off-line method can be applied both to hollow bodies and to profiles and films of plastic. It is a method for after-treatment of the finished parts in a reaction chamber. The total surface is treated thereby. The advantage of the off-line method consists in the high flexibility of the process sequences. By decoupling the treatment from the manufacture, it is possible to vary the parameters of the method within a wide range so that optimum adaptation of the fluorination to the general conditions of manufacture can be effected.

The advantages of the fluorination method are, inter alia:
- High and uniform distribution of the surface tension (polarity), independently of the geometry of the parts.
- No damage to the base polymer.
- Long-term stability of the treatment effect.
- Bulk treatment of small parts.
- Applicable to thin-walled components.
- Flexible process sequences.
- High degree of automation.
- High process reliability.

The fluorination of different plastics for producing a fluorine-containing layer on these plastics is widely used. The fluorine-containing layer on the plastics has a certain barrier effect with respect to the penetration of volatile substances. For example, the plastic tank walls of fuel tanks are fluorinated for preventing the permeation of fuels for vehicles.

EP 1 234 849 A1 discloses a process for the treatment of plastic surfaces by gas-phase fluorination, in which a reaction chamber with the material to be treated, which has a plastic surface, is evacuated to a pressure of not more than 10 mbar absolute or a tenth of the treatment pressure or less and a fluorine-containing gas mixture of defined composition is introduced into the reaction chamber until a treatment pressure in the range from 25 to 250 mbar absolute is reached.

EP 0 566 883 B1 describes a process for the fluorination of inner surfaces of plastic containers with a gas which contains, for example, 1% of fluorine, at a pressure of 2 to 10 bar and a surface temperature of 60 to 250° C. of the inner surface of the hollow body. The fluorine-containing treatment gas enters the hollow body at a temperature between −20° C. and −196° C.

Furthermore, EP 0 809 670 B1 discloses a fluorination process which takes place in four process steps at different pressures. In the first stage of the fluorination process, the ambient pressure P1 of the polymer to be fluorinated is reduced to 0.001 to 0.5 kPa with the aid of a vacuum pump in the absence of the fluorinating agent in the reaction chamber. In a second stage, the pressure P2 in the reaction chamber is increased to 0.1 to 300 kPa with the aid of a fluorinating agent. The pressure in the reaction chamber is then reduced to 0.01 to 1 kPa. In a third stage, the pressure is adjusted to 0.1 to 300 kPa. Thereafter, the pressure is reduced again to 0.01 to 1 kPa. In the fourth stage, the pressure is adjusted to 0.1 to 1000 kPa. Thereafter, the fluorinated polymeric material is removed from the reaction chamber. This process is complicated since four stages are envisaged altogether and the pressure is also reduced in each case between the individual stages and requires at least one vacuum pump for the respective pressure reductions between the individual stages.

Furthermore, DE 198 32 559 C2 discloses a fluorination process for plastics in which a plastic article to be fluorinated is introduced into a reaction chamber and, after evacuation, is subjected to the fluorination in an atmosphere containing an inert gas and fluorine. The gas present in the reaction chamber and the article to be fluorinated are kept at a temperature greater than or equal to 40° C. during the evacuation and the fluorination and, after the fluorination, a vacuum is applied and is maintained until unconverted fluorine molecules have diffused out of the plastic article. The pressure of the fluorine/nitrogen mixture during the fluorination is 40 mbar.

A common feature of the known fluorination processes is the treatment of the plastic in a vacuum-tight reaction chamber and the fluorination under reduced pressure of the fluorination gas mixture. The plastic parts or plastic mouldings to be treated are introduced into the vacuum-tight reaction chamber and the latter is evacuated for removing atmospheric oxygen and is flooded with an inert gas. After further to evacuation of the reaction chamber, the fluorine-containing treatment gas is metered into the reaction chamber. The fluorination takes place either continuously at reduced pressure or in a plurality of stages, the individual stages taking place at different pressures and evacuation being effected again in each case between the stages. In the prior art, the reaction chambers are flushed by repeated evacuation and flooding with inert gas after the end of the fluorination. The complexity of the apparatus in the known processes is high since the reaction chambers have to be vacuum-tight and at least one vacuum pump has to be present for the evacuation.

The fluorination in vacuo of pressure-sensitive plastic surfaces which have, for example, a closed thin-skinned honeycomb structure and of closed-pore plastic foams faces in practice the problem that, in vacuo, the thin-skinned honeycomb structure and the pores of the plastic foams burst open since the gases enclosed therein, such as air, nucleating agents, or blowing agents, are generally gaseous, expand in vacuo and the structure of such plastics is thus damaged.

SUMMARY OF THE INVENTION

It is an object of the invention to provide a method and an apparatus for the fluorination of surfaces of plastics, which manage with apparatus which is less complicated than known methods and apparatuses and, inter alia, permit the fluorination of pressure-sensitive plastic parts, such as plastic foams, plastic granules, closed honeycomb-like surface structures of plastics.

This object is achieved by the method of the present invention which provides for the fluorination of plastics in which one or more plastic articles to be fluorinated are introduced into a reaction chamber and then subjected to a gas-phase fluorination. The gas-phase fluorination step of the process is carried out at atmospheric pressure in the reaction chamber. The present invention further provides for an apparatus for carrying out the claimed method.

It is also true that the flushing carried out before the gas-phase fluorination for complete or partial removal of atmospheric oxygen from the reaction chamber is effected at atmospheric pressure in the reaction chamber. In a further development of the method, a fluorine-containing gas mixture of pre-determined composition comprising fluorine gas or a fluorinating agent and one or more inert gases is used for the gas-phase fluorination. For this purpose, the fluorine-containing gas mixture advantageously contains fluorine gas or a fluorinating agent in an amount of 0.1 to 30% by volume, based on the total volume of the gas mixture and the amount of inert gas or gases complementary thereto. The gas mixture preferably contains 0.1 to 20% by volume of fluorine gas or fluorinating agent and in particular 0.1 to 10% by volume of fluorine gas. In a specific development of the method the gas mixture contains 10% by volume of fluorine gas or fluorinating agent. The inert gas is preferably selected from the group consisting of nitrogen, argon, helium and neon. In a further development of the method, the gas-phase fluorination is carried out with elemental fluorine, halogen fluorides or noble gas fluorides, such as $XeF_2$ or $XeF_4$.

Within the scope of the object to be achieved, an apparatus for the fluorination of plastic, comprising a reaction chamber and a cover, is used, which apparatus is distinguished in that the non-evacuable reaction chamber has, on the entrance side, metering valves V0, V1, V2 for air, inert gas and gas mixture comprising fluorine and one or more inert gases, and in that a release valve V3 and a flow-through/shut-off valve V4 are arranged in an exhaust gas line of the reaction chamber.

In a first embodiment of the apparatus according to the invention, the reaction chamber is arranged in a fixed position, and a controllable heater for heating the gas mixture and a circulation pump for turbulent circulation of the gas mixture in the reaction chamber are provided. A second embodiment of the apparatus is equipped with a reaction chamber in which a rotating drum having a perforated circumferential drum surface is arranged. The plastic articles or plastic parts to be fluorinated are introduced into this rotating drum. A third embodiment of the apparatus according to the invention is distinguished in that the reaction chamber is a rotating drum having a closed circumferential surface over the whole area and in that a drive motor, arranged outside the reaction chamber, engages with the circumferential drum surface and causes the rotating drum to move.

Further details of the embodiments of the apparatus are evident herebelow.

The method according to the invention and the apparatus achieve the advantages that, in contrast to known fluorination methods, the gas-phase fluorination in the reaction chamber is not evacuated for carrying out the flushing and the fluorination. The flushing and the fluorination take place at ambient pressure, i.e. atmospheric pressure, with the result that the highly complex apparatus in the case of the known methods and apparatuses, in each case requiring a pressure-tight vacuum reaction chamber and a vacuum pump, is dispensed with. Moreover, the residence times of the plastic articles to be fluorinated in the reaction chamber and the total duration of the gas-phase fluorination can generally be reduced.

BRIEF DESCRIPTION OF THE FIGURES

For a further understanding of the nature and objects for the present invention, reference should be made to the detailed description, taken in conjunction with the accompanying figures, in which like elements are given the same or analogous reference numbers and wherein.

DETAILED DESCRIPTION OF THE INVENTION

In the method of the present invention, plastics introduced into a reaction chamber are subjected to a gas-phase fluorination. The gas-phase fluorination is carried out at atmospheric pressure in the reaction chamber.

Figure 1:
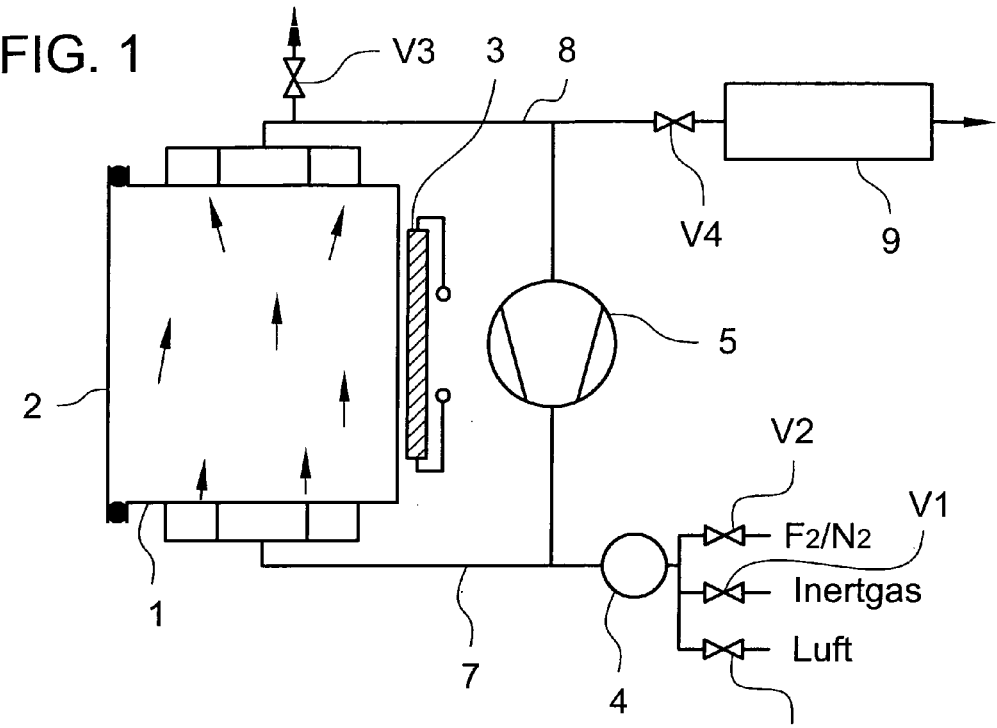
FIG. 1 schematically shows a first embodiment of an apparatus according to the invention, FIG. 2 schematically shows a second embodiment of the apparatus according to the invention, and FIG. 3 schematically shows a third embodiment of the apparatus according to the invention.

FIG. 1 schematically shows an apparatus for the fluorination of plastic articles, which has a reaction chamber 1 in a fixed position with a cover 2, a heater 3 for the reaction chamber and a circulation pump 5. The plastic articles to be treated are introduced into the reaction chamber 1 after the cover 2 has been opened and said reaction chamber is then closed again by the cover 2. A seal 6 ensures a tight seal between the reaction chamber 1 and the cover 2. The reaction chamber 1 is not vacuum-tight and therefore also not evacuable. Metering valves V0, V1, V2 for air, inert gases and a gas mixture comprising fluorine and one or more inert gases are present on the entrance side, the metering valves being arranged parallel to one another and being connected via a common line to a flow meter 4, from which a gas feed line 7 leads to the reaction chamber 1. The heater 3 is arranged on that side of the reaction chamber 1 which is opposite the cover 2. The arrows in the reaction chamber 1 indicate the directions of the part-streams inside the reaction chamber 1. On the exit side, an exhaust gas line 8 leads from the reaction chamber 1 via a flow-through/shut-off valve V4 to an absorber 9. A release valve V3 is present in a branch of the exhaust gas line 8, close to the connection of the exhaust gas line 8 to the reaction chamber 1. The circulation pump 5 is arranged parallel to the reaction chamber 1 and is connected to the exhaust gas line 8 and to the gas feed line 7. The connection of the circulation pump 5 to the exhaust gas line 8 is present between the valves V3 and V4. The connection of the circulation pump 5 to the gas feed line 7 is located downstream in the direction of flow after the flow meter 4. For homogenization of the internal atmosphere of the reaction chamber 1, it is also possible to provide a blower in the reaction chamber. The plastic articles or plastic parts to be treated are introduced into the reaction chamber 1. The atmospheric oxygen in the reaction chamber 1 is removed by flushing with a defined amount of to inert gas by first allowing the inert gas to flow into the flow meter 4 via the valve V1. The inert gas which is usually under reduced pressure is let down to ambient pressure or normal pressure, i.e. atmospheric pressure, before the metering valve V1. After emerging from the flow meter, the inert gas is metered via the gas feed line 7 into the reaction chamber 1. The atmospheric oxygen present in the reaction chamber 1 escapes via the opened release valve V3. The flushing can be continued until the interior of the reaction chamber 1 contains only inert gas. It is also possible to effect fluorination in the presence of atmospheric oxygen by stopping the flushing with inert gas prematurely in order to leave a certain amount of atmospheric oxygen in the reaction chamber 1. The flushing is effected either by time control after empirical determination of the duration of flushing or by analytical monitoring by controlling the metering and flushing times at pre-determined flow rates of the gas mixture to be metered and of the inert flushing gas. For this purpose, the compositions of the amounts flowing away through the release valve V3 are analytically monitored, i.e. measured, and the analytical values obtained are used for controlling the times. After the end of the flushing, the metering valve V1 and the shut-off valve V3 are closed. Thereafter, the gas-phase fluorination begins by opening the metering valve V2 for the gas mixture and metering the fluorine-containing treatment gas via the flow meter 4 into the reaction chamber 1. The inert gas inside the reaction chamber 1 escapes via the opened flow-through/shut-off valve V4 into an absorber 9, via which it is disposed of. During the metering process, the fluorine concentration in the reaction chamber 1 slowly increases. The fluorine concentration can be adjusted up to the pre-determined gas concentration for the gas-phase fluorination by means of the flow rate and the duration of metering. By controlling the increase in concentration, it is additionally possible to influence the reaction. After complete or partial exchange of the inert gas atmosphere for the fluorination gas, the metering process is terminated and the flowthrough/shut-off valve V4 is closed. The fluorine-containing gas mixture provided for the gas-phase fluorination consists of fluorine gas or a fluorinating agent in an amount of 0.1 to 30% by volume, based on the total volume of the gas mixture. The gas mixture contains, as a diluent gas, an individual inert gas or two or more inert gases which are selected from the group consisting of nitrogen, argon, helium and neon. The gas mixture may furthermore contain 0.1 to 20% by volume of fluorine gas or fluorinating agent and in particular 0.1 to 10% by volume. A preferred gas mixture contains 10% by volume of fluorine gas or fluorinating agent. In particular, the gas-phase fluorination is carried out using elemental fluorine, halogen fluorides or noble gas fluorides, such as $XeF_2$ or $XeF_4$. If nitrogen is used as the inert gas, the fluorine-containing gas mixture comprises 5 to 15% by volume, in particular 10% by volume, of fluorine.

Switching on the circulation pump 5 produces a turbulent flow in the reaction chamber 1, which improves the fluorine reaction. The method sequence described above is static since the flow-through/shut-off valve V4 is closed during the fluorination and the switching on of the circulation pump 5 and hence the gas mixture circulates but fresh gas mixture is not fed in. It is also possible to meter the gas mixture into the reaction chamber in a manner optimized with respect to gas dynamics, so that substantial homogenization of the atmosphere in the reaction chamber is established. It is then possible to dispense with a blower and/or a circulation pump.

However, the fluorination is also effected dynamically in particular if the gas mixture is metered in via the metering valve V2 and flows away via the opened flowthrough/shut-off valve V4. The dynamic procedure has the advantage that the reaction product hydrogen fluoride, which inhibits the fluorine reaction, can be discharged from the reaction chamber 1 into the absorber 9 and disposed of appropriately.

After the end of the gas-phase fluorination, inert gas is metered in via the opened metering valve V1 for flushing the reaction chamber 1, and the flow-through/shut-off valve V4 is opened. The flushing after the end of the gas-phase fluorination can also be effected with air. The heater 3 is regulated so that the temperature of the gas mixture inside the reaction chamber 1 is between 15 and 50° C.

Figure 2:
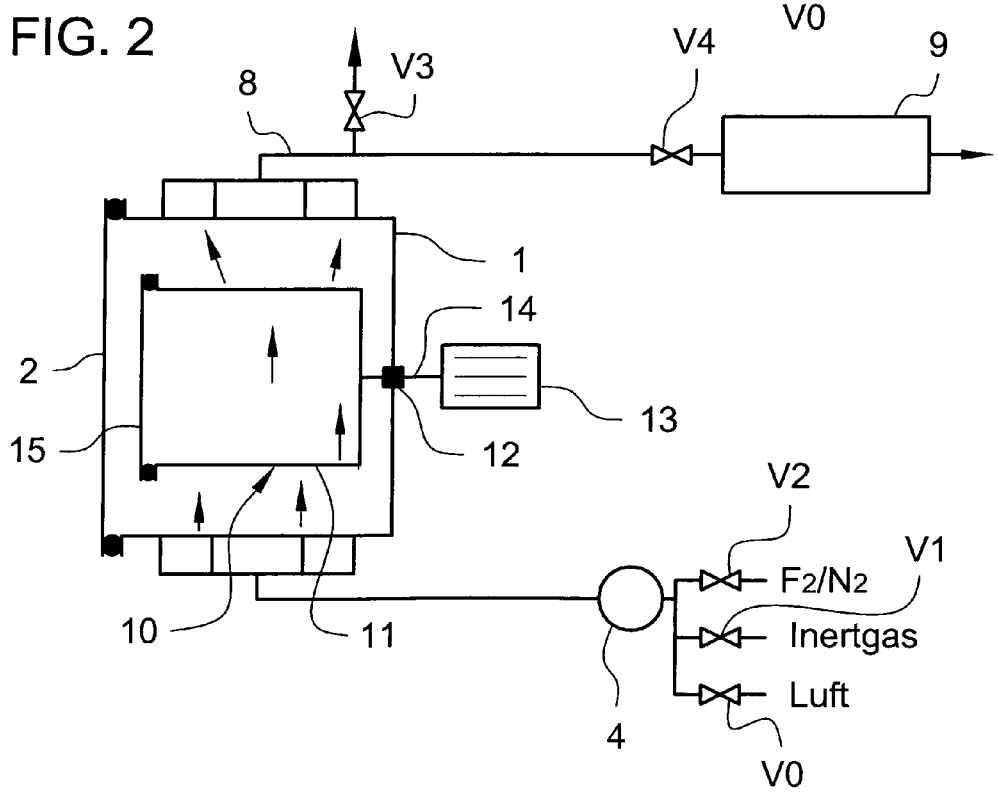

FIG. 2 schematically shows a further embodiment of the apparatus according to the to invention, and the same components which are present in FIG. 1 are given the same reference numerals and their description is not repeated. A rotating drum having a perforated circumferential drum surface 11 is present in the reaction chamber 1 of this embodiment. The rotating drum 10 is equipped with a detachable cover end face 15 which prevents parts from falling out of the rotating drum 10. The cover end face 15 can, but need not, be sealed. The reaction chamber 1, as in the embodiment according to FIG. 1, has a cover 2 which is connected to the housing of the reaction chamber 1 via a seal 6. A drive motor 13 having a drive shaft 14 which is passed through a sealed rotary leadthrough 12 in one of the walls of the reaction chamber 1 is present outside the reaction chamber 1. This drive shaft 14 is firmly connected to the rotating drum 10. At the beginning of the gas-phase fluorination, the cover 2 of the reaction chamber 1 and the cover end face 15 of the rotating drum 10 are opened so that the plastic articles and plastic parts to be treated can be introduced into the rotating drum 10. Thereafter, the rotating drum 10 and the reaction chamber 1 are closed. The drive motor 13 is switched on and causes the rotating drum 10 to rotate. The atmospheric oxygen is removed by flushing with a defined amount of inert gas via the opened metering valve V1. The air present in the reaction chamber 1 escapes via the opened release valve V3. Owing to the perforations in the circumferential drum surface 11, unhindered gas exchange takes place in the rotating drum 10. If fluorination is effected in the presence of atmospheric oxygen, the flushing can be ended prematurely in order to leave a certain amount of atmospheric oxygen in the reaction chamber 1. As in the embodiment according to FIG. 1, the flushing is regulated by controlling the duration of the flushing gas metering as a function of time at a pre-determined flow rate of flushing gas and can be monitored by the analytical values of the gas composition of the gas mixture flowing away via the opened valve V3. After the end of the flushing, the metering valve V1 and the release valve V3 are closed.

Thereafter, the gas-phase fluorination begins by opening the metering valve V2 and passing the fluorine-containing treatment gas into the reaction chamber 1. The inert gas escapes via the opened flow-through/shut-off valve V4 into the absorber 9. While the fluorinating gas is flowing in, the fluorine concentration in the rotating drum 10 slowly increases. Rotation of the rotating drum 10 produces homogenization of the gas mixture. Of course, the reaction chamber 1 can also be equipped with a heater 3 as in the embodiment according to FIG. 1, although this is not shown.

The fluorine concentration can be freely chosen between 0 and the desired treatment gas concentration by means of the flow rate and the duration of the metering. By controlling the increase in concentration, the reaction can be additionally influenced. After complete or partial exchange of the inert gas atmosphere for the fluorinated treatment gas, the metering process is terminated and the flowthrough/shut-off valve V4 is closed. The procedure described above takes place statically, but the fluorination can, as was described in relation to the embodiment according to FIG. 1, also be effected in particular dynamically. For this purpose, the fluorinated gas mixture is metered in via the metering valve V2 and escapes via the opened flow-through/shut-off valve V4. In this case too, the advantage is achieved that the reaction product hydrogen fluoride, which triggers the fluorine reaction, is discharged from the reaction chamber 1.

After the end of the gas-phase fluorination, the inert gas is passed in via the opened metering valve V1 and the opened flow-through/shut-off valve V4 for flushing the reaction chamber 1. The flushing can also be effected with air instead of with an inert gas. The valve V3 is closed in this case in order to prevent emergence of the fluorine into the atmosphere. The metering and flushing processes are likewise regulated by controlling the metering of the flushing or treatment gas as a function of time at a pre-determined flow rate. By establishing the duration of metering, the required amount of treatment gas can be metered in at a known volume flow rate, controlled by means of the flow meter 4. In addition, analytical monitoring is possible.

Figure 3:
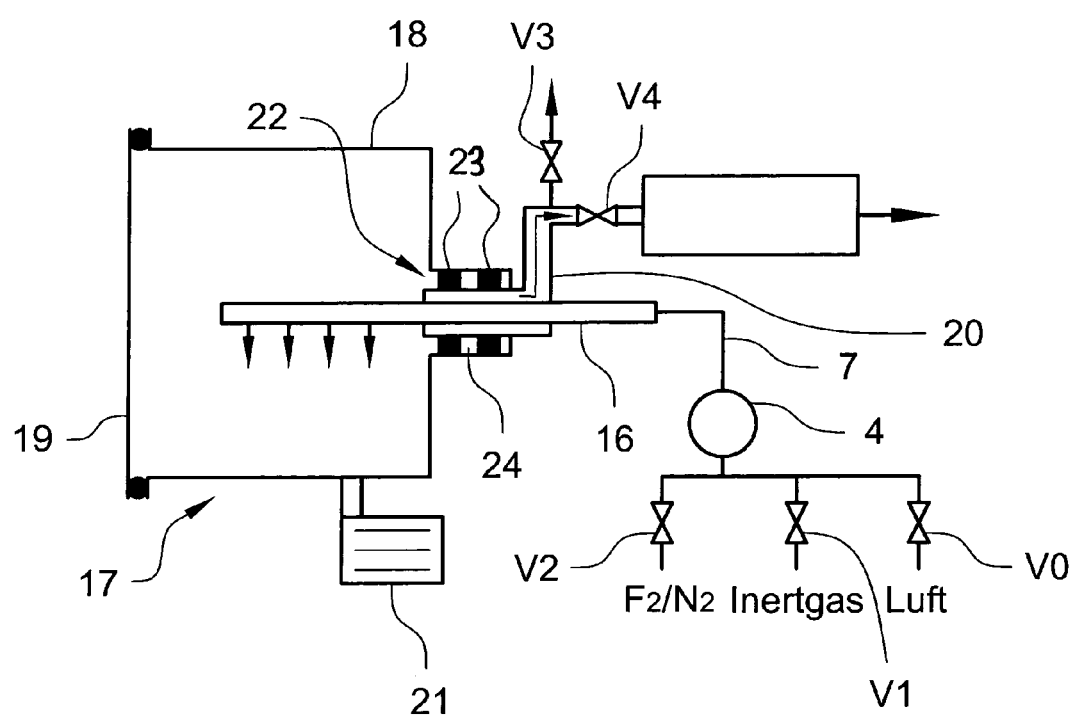

A further embodiment of the apparatus according to the invention is shown schematically in FIG. 3. Here, the reaction chamber is in the form of a rotating drum 17 having a closed circumferential drum surface 18 over the whole area. The rotating drum 17 has a cover 19 which is connected with a seal to the rotating drum 17 and is removable if required. The components in this embodiment which are identical to those in the embodiments according to FIGS. 1 and 2 are provided with the same reference numerals and are not described individually. A drive motor 21 is present outside the rotating drum 17 and engages with the circumferential drum surface 18 and, when switched on, causes the rotating drum to move. The metering valves V0, V1, V2 are connected to the gas feed line 7, to which a metering line 16, which projects into the rotating drum 17, connects. This metering line 16 is simultaneously the axis of rotation about which the rotating drum 17 rotates. The metering line 16 has, in its circumferential surface, holes through which the fluorine-containing treatment gas emerges into the interior of the rotating drum 17. In a lead-through region 22 of the rotating drum 17, the metering line 16 is surrounded coaxially by an exhaust gas line 20 which is a distance away from the metering line 16. In the lead-through region 22, the exhaust gas line 20 together with the metering line 16 forms a reinforced section of the axis of rotation of the rotating drum 17. Two seals 23, 23 between which a pivot bearing 24, for example a ball bearing, is arranged are present in the lead-through region 22. The gas-tight rotary lead-through rests on the exhaust gas line 20 and is configured for the rotation of the rotating drum 17.

With this embodiment of the apparatus according to the invention, loose polymeric bulk materials, such as, for example, plastic granules, powders, plastic foams, mouldings and shaped parts, and fibres, can be fluorinated. The rotating drum 17 is a closed unit without additional outer housing. The procedure is the same as that described above with reference to the embodiments according to FIGS. 1 and 2.

The residence time of the plastic articles and polymeric bulk materials to be fluorinated in the embodiments of the apparatus according to the invention is 0.5 min to 12 h, in particular 0.5 min to 6 h. The short residence times of 0.5 min to 1 min are sufficient for functionalization of polymers.

LIST OF REFERENCE NUMERALS

1=Reaction chamber (fixed position)
2=Cover
V0, V1, V2=Metering valves
3=Heater
4=Flow meter
5=Circulation pump
6=Seal
7=Gas feed line
V3=Release valve
V4=Flow-through/shut-off valve
8=Exhaust gas line
9=Absorber
10=Rotating drum
11=Circumferential drum surface (perforated)
12=Rotary lead-through
13=Drive motor
14=Drive shaft
15=Cover end face
16=Metering line
17=Rotating drum
18=Circumferential drum surface (closed)
19=Cover
20=Exhaust gas line
21=Drive motor
22=Lead-through region
23, 23=Seals
24=Pivot bearing (ball bearing)

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for the fluorination of plastics comprising the steps of:
   a) introducing one or more plastic articles to be fluorinated into a reaction chamber,
   b) metering into the reaction chamber a gas comprising fluorine,
   c) subjecting the plastic articles to a gas-phase fluorination at atmospheric pressure in the reaction chamber,
   d) analytically monitoring an exhaust gas exiting the reaction chamber, and
   e) controlling a metering time of step b) based on an analytical value obtained by step d).

2. The method of claim 1, further comprising a step of flushing the plastic article at atmospheric pressure in the reaction chamber for complete or partial removal of atmospheric oxygen from the reaction chamber before the metering step b).

3. The method of claim 1, wherein the fluorine-containing gas of step b) consists of a fluorine gas or a fluorinating agent and one or more inert gases.

4. The method of claim 3, wherein the fluorine-containing gas mixture consists of fluorine gas or a fluorinating agent in an amount of from about 0.1 to about 30% by volume, based on the total volume of the gas mixture, and the amount of inert gas or gases complementary thereto.

5. The method of claim 4, wherein the fluorine-containing gas mixture consists of from about 0.1 to about 20% by volume, based on the total volume of the gas mixture, of fluorine gas or fluorinating agent.

6. The method of claim 4, wherein the gas mixture consists of from about 0.1 to about 10% by volume, based on the total volume of the gas mixture, of fluorine gas or fluorinating agent.

7. The method of claim 6, wherein the gas mixture consists of about 10% by volume, based on the total volume of the gas mixture, of fluorine gas or fluorinating agent.

8. The method of claim 4, wherein the inert gas is selected from nitrogen, argon, helium and neon.

9. The method of claim 1, wherein the gas-phase fluorination is carried out with elemental fluorine, halogen fluorides or noble gas fluorides.

10. The method of claim 9, wherein the gas-phase fluorination is carried out with $XeF_2$ or $XeF_4$.

11. The method of claim 1, wherein the fluorine-containing gas mixture consists of from about 5 to about 15% by volume of fluorine in a nitrogen gas.

12. The method of claim 11, wherein the fluorine-containing gas mixture consists of about 10% by volume of fluorine in a nitrogen gas.

13. The method of claim 1, wherein the gas-phase fluorination is effected statically, the reaction chamber being kept closed on the entrance and exit sides over a time span of from about 0.5 minutes to about 12 hours after metering in the gas mixture.

14. The method of claim 1, wherein the gas-phase fluorination is effected dynamically in that the gas mixture metered in flows continuously through the reaction chamber.

15. The method of claim 1, wherein the temperature during the gas-phase fluorination in the reaction chamber is in the range of from about 15° C. to about 50° C.

16. The method of claim 1, wherein the gas mixture is circulated and exhibits turbulent flow in the reaction chamber.

17. The method of claim 1, wherein the gas mixture is metered into the reaction chamber in a manner optimized with respect to gas dynamics, so that substantial homogenization of the atmosphere in the reaction chamber is established.

18. The method of claim 1, further comprising flushing with inert gas or air after the end of the gas-phase fluorination.

19. The method of claim 2, wherein the metering and flushing times are controlled at known volume flow rates by fixing the duration of metering.

20. The method of claim 1, wherein the plastics to be fluorinated are selected from containers, fibers, polymeric granules, powders, plastic foams, mouldings and shaped parts.

21. The method of claim 2, further comprising the steps of analytically monitoring a flushing exhaust gas exiting the reaction chamber, and controlling a flushing time based on an analytical value obtained for the flushing exhaust gas.

22. The method of claim 1, wherein one or more plastic articles to be fluorinated are pressure-sensitive and the reaction chamber is not evacuated while carrying out the method.

23. The method of claim 2, wherein one or more plastic articles to be fluorinated are pressure-sensitive and the reaction chamber is not evacuated while carrying out the method.

* * * * *